US009292552B2

(12) United States Patent
Arngren et al.

(10) Patent No.: US 9,292,552 B2
(45) Date of Patent: Mar. 22, 2016

(54) APPARATUS, METHODS, AND COMPUTER PROGRAM PRODUCTS FOR ADAPTIVE MULTIMEDIA CONTENT INDEXING

(71) Applicant: Telefonaktiebolaget L M Ericsson (publ), Stockholm (SE)

(72) Inventors: Tommy Arngren, Sodra Sunderbyn (SE); Arif Kamal, Lulea (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 338 days.

(21) Appl. No.: 13/688,566

(22) Filed: Nov. 29, 2012

(65) Prior Publication Data

US 2014/0032538 A1    Jan. 30, 2014

Related U.S. Application Data

(63) Continuation-in-part of application No. 13/559,258, filed on Jul. 26, 2012.

(51) Int. Cl.
*G06F 17/30* (2006.01)

(52) U.S. Cl.
CPC ...... *G06F 17/30321* (2013.01); *G06F 17/3002* (2013.01); *G06F 17/30017* (2013.01); *G06F 17/30029* (2013.01); *G06F 17/30787* (2013.01)

(58) Field of Classification Search
CPC .............. G06F 17/30321; G06F 17/30864; G06F 17/3002; G06F 17/30787; G06F 17/30829; G06F 17/30017; G06F 17/30029
USPC .......................... 707/723, 732, 741, 728, 609
See application file for complete search history.

(56) References Cited

U.S. PATENT DOCUMENTS

| 5,678,040 | A  | * | 10/1997 | Vasudevan et al. |
| 6,374,260 | B1 | * | 4/2002  | Hoffert ............. G06F 17/30038 |
| 6,643,643 | B1 | * | 11/2003 | Lee et al. |
| 7,493,312 | B2 | * | 2/2009  | Liu .................... G06F 17/30017 |
| 7,627,556 | B2 | * | 12/2009 | Liu et al. |
| 8,060,906 | B2 | * | 11/2011 | Begeja ............... G06F 17/30017 725/13 |
| 8,065,301 | B2 | * | 11/2011 | Ginsburg et al. ............. 707/736 |

(Continued)

OTHER PUBLICATIONS

Lew, M.S., et al. "Content-Based Multimedia Information Retrieval: State of the Art and Challenges", ACM Transactions on Multimedia Computing, Communications and Applications, vol. 2, No. 1, Feb. 2006, pp. 1-19.

(Continued)

*Primary Examiner* — Jean M Corrielus
(74) *Attorney, Agent, or Firm* — Patent Portfolio Builders, PLLC

(57) ABSTRACT

This disclosure provides, among other things, a method for adaptive indexing of multimedia content. In some embodiments, the method includes: identifying a keyword associated with a feature found in a data portion of a multimedia item, the keyword being associated with a media type, and the media type being associated with a weight; determining a relevance for the keyword using the weight associated with the media type associated with the keyword; updating the weight associated with the media type based on a particular set of content items, wherein each content item included in the particular set was added to the particular set of content items because the content item was selected by a user from a set of content items that were identified to the user in response to a query from the user, thereby producing an updated weight; and updating the relevance of the keyword using the updated weight.

27 Claims, 14 Drawing Sheets

(56) References Cited

U.S. PATENT DOCUMENTS

| | | | |
|---|---|---|---|
| 8,166,029 B2* | 4/2012 | Park et al. .................... | 707/732 |
| 8,566,370 B2* | 10/2013 | Jin .................... | G06F 17/30029 |
| | | | 707/609 |
| 2002/0161747 A1* | 10/2002 | Li et al. ............................ | 707/3 |
| 2003/0105589 A1* | 6/2003 | Liu .................... | G06F 17/30017 |
| | | | 702/1 |
| 2003/0108334 A1* | 6/2003 | Nevenka et al. ................ | 386/95 |
| 2004/0025180 A1* | 2/2004 | Begeja .............. | G06F 17/30017 |
| | | | 725/46 |
| 2004/0215663 A1* | 10/2004 | Liu .................... | G06F 17/30017 |
| 2004/0220925 A1* | 11/2004 | Liu .................... | G06F 17/30017 |
| 2005/0222981 A1* | 10/2005 | Lawrence ......... | G06F 17/30864 |
| 2007/0067304 A1* | 3/2007 | Ives ....................... | G06Q 30/02 |
| 2008/0016101 A1* | 1/2008 | Ginsburg et al. ............. | 707/102 |
| 2009/0138472 A1* | 5/2009 | MacLean .......................... | 707/7 |
| 2009/0240674 A1* | 9/2009 | Wilde ............... | G06F 17/30899 |
| 2011/0047163 A1* | 2/2011 | Chechik ............ | G06F 17/30781 |
| | | | 707/741 |
| 2012/0158713 A1* | 6/2012 | Jin .................... | G06F 17/30029 |
| | | | 707/728 |

OTHER PUBLICATIONS

"MPEG-7 Overview", International Organisation for Standardisation Organisation Internationale de Normalisaton, ISO/IEC JTC1/SC29/WG11, Coding of Moving Pictures and Audio, Oct. 2004, pp. 1-95.

* cited by examiner

| File | Date | Loc. | UID | DevID | Seg. | Keyword | Img | Text | Sound | Voice | Prom | WRel | WFact | Score |
|---|---|---|---|---|---|---|---|---|---|---|---|---|---|---|
| F | D | L | 1 | myPhone | 1 | Lisa | x | | | x | 10 | 1 | 1.5 | |
| F | D | L | 1 | myPhone | 2 | Olle | x | | | | 5 | 1 | 1.5 | |
| F | D | L | 1 | myPhone | 2 | Lisa | | x | | x | 4 | .5 | 1.3 | |
| F | D | L | 1 | myPhone | 3 | ICA | x | | | | 4 | .3 | 1.2 | |
| F | D | L | 1 | myPhone | 3 | Banana | x | | | | 7 | .6 | 1.4 | |
| F | D | L | 1 | myPhone | 3 | Jerry | x | | | x | 5 | .2 | 1.2 | |
| F | D | L | 1 | myPhone | 4 | Ball | x | | | | 1 | .4 | 1 | |

SSD table 500

*FIG. 5*

SSD table 700

| File | Date | Loc. | UID | DevID | Seg. | Keyword | Img | Text | Sound | Voice | Prom | WRel | WFact | Score |
|------|------|------|-----|--------|------|---------|-----|------|-------|-------|------|------|-------|-------|
| F | D | L | 1 | myPhone | 1 | Lisa | x | | | x | 10 | 1 | 1.5 | 33.0 |
| F | D | L | 1 | myPhone | 2 | Olle | x | | | | 5 | 1 | 1.5 | 22.5 |
| F | D | L | 1 | myPhone | 2 | Lisa | | x | | x | 4 | .5 | 1.3 | 7.2 |
| F | D | L | 1 | myPhone | 3 | ICA | x | | | | 4 | .3 | 1.2 | 5.0 |
| F | D | L | 1 | myPhone | 3 | Banana | x | | | | 7 | .6 | 1.4 | 12.6 |
| F | D | L | 1 | myPhone | 3 | Jerry | x | | | x | 5 | .2 | 1.2 | 4.6 |
| F | D | L | 1 | myPhone | 4 | Ball | x | | | | 1 | .4 | 1 | 4.4 |

Index 720

| Score | Keyword | File | Seg. |
|-------|---------|------|------|
| 33 | Lisa | F | 1 |
| 22.5 | Olle | F | 2 |
| 7.2 | Lisa | F | 2 |
| 5 | ICA | F | 3 |
| 12.6 | Banana | F | 3 |
| 4.6 | Jerry | F | 3 |
| 4.4 | Ball | F | 4 |

Weight table 710

| GroupID | Media Type | Weight |
|---------|-----------|--------|
| 6 | Image | 10 |
| 6 | Text | 5 |
| 6 | Sound | 3 |
| 6 | Voice | 2 |

*FIG. 7*

APPARATUS, METHODS, AND COMPUTER PROGRAM PRODUCTS FOR ADAPTIVE MULTIMEDIA CONTENT INDEXING

CROSS REFERENCE TO RELATED APPLICATIONS

This application is a continuation-in-part of U.S. patent application Ser. No. 13/559,258 filed Jul. 26, 2012, which is incorporated by reference herein.

TECHNICAL FIELD

Embodiments relate generally to digital search techniques and more specifically, to indexing of multimedia content.

BACKGROUND

As the available amount of content grows, so does the need for effective search and retrieval systems. Search and retrieval systems ("search engines") typically operate by receiving (e.g., from a user) a textual query of terms and/or phrases. The search engine compares the search terms ("keywords") against an index created from a multitude of content items (e.g., text files, image files (e.g., .jpg files, .gif files), video files (e.g, .mpg files, .swf files, .avi files), and web pages or other items) and returns an indication of the most relevant content items. The classic example of a search engine is an Internet search engine that uses user-provided keywords to find relevant web pages and returns a listing of the most relevant ones. As is known to one skilled in the art, a web page may comprise a textual content item (e.g., a base hypertext markup language (HTML) document) and other content items (e.g., image files, movie files, sound files) presented by a web browser as a result of processing the HTML document and items referenced therein.

As the amount of digital data increases, search engines are being deployed not only for Internet search, but also for proprietary, personal, or special-purpose databases, such as personal multimedia archives, user generated content sites, proprietary data stores, workplace databases, and others. For example, personal computers may host search engines to find content items on the entire computer or in special-purpose archives (e.g., personal music or video collection). User generated content sites, which host process content items by creating indices. Once created, indices allow a search engine to map search terms to relevant content items without need to rescan all of the content items on each search. Therefore, the quality of search results is heavily dependent on the quality of the index generated. Accordingly, more effective techniques for generating accurate search indices are needed.

SUMMARY

In one aspect, this disclosure discloses a method for adaptive indexing of multimedia content. The method provides several advantages. For example, the method enables personalized indexing of non-textual content (e.g., image data, video data, audio data). The method also enables an improved search engine.

In some embodiments, the method includes identifying a keyword associated with a feature found in a data portion of a multimedia item, the feature being of a first media type, and the first media type being associated with a first weight. The method may also include determining a relevance for the keyword using said first weight. The method may further include updating the first weight associated with the first media type based on a search result selected by a user from a set of search results that were identified to the user in response to a query from the user, thereby producing an updated first weight, wherein the selected search result indicates a multimedia item having a feature being of the first media type and being associated with the keyword. The method may also include updating the relevance of the keyword using the updated first weight.

In some embodiments, the first media type may be one of image, sound, voice, and text, and, in some embodiments, the first weight associated with the first media type may be associated with a set of one or more users or devices and not with any other set of users or devices.

In some embodiments, the method further includes, prior to updating the first weight, determining a number of content items that have been selected by one or more users in response to one or more queries by the one or more users, and the step of updating the first weight occurs in response to a determination that the determined number meets or exceeds a predetermined threshold.

In some embodiments, the method further includes: transmitting, from a server to a client device in response to receiving from the client device a query comprising a query keyword, a search result identifying a set of content items that match the query; identifying a content item selected by a user of the client device from the set of items; and determining whether data associated with the selected content item indicates that the content item contains a feature that is (i) mapped to the keyword and (ii) of the same media type as the least one media type. In some embodiments, in response to determining that the data associated with the selected content item indicates that the content item contains a feature that is (i) mapped to the keyword and (ii) of the same media type as the least one media type, the method further includes updating a counter, where the step of updating the first weight comprises updating the first weight using the counter.

In some embodiments, the step of updating the first weight comprises updating the first weight based on a distribution of determined feature types across N queries, where N>1. In such embodiments, the updated weight may be based on a ratio among current weights and a ratio among the distribution of determined feature types across the N queries. Additionally, in such embodiments, the updated weight may be based on a weighted average of a ratio among current weights and a ratio among the distribution of determined feature types across the N queries.

In some embodiments, the keyword is further associated with a second media type, and the second media type is associated with a second weight, and the step of determining the relevance for the keyword comprises calculating a relevance value using the first weight and the second weight. In such embodiments, the method may further include updating the second weight based on the particular set of content items, thereby producing an updated second weight, and the step of updating the relevance of the keyword may include calculating a relevance value using the updated first weight and updated second weight.

In some embodiments, the multimedia item is a web page comprising a first file and a second file, wherein the first file is an HTML document and the second file is one of an image file and a video file, the keyword is further associated with a second feature of the second media type, the first feature with which the keyword is associated was found in a data portion of the first file, and the second feature with which the keyword is associated was found in a data portion of the second file.

In another aspect, this disclosure describes an apparatus for adaptive indexing of content. In some embodiments, the apparatus is configured to: (a) identify a keyword associated with a feature found in a data portion of a multimedia item, the feature being of a first media type, and the first media type being associated with a first weight; (b) determine a relevance for the keyword using the first weight; (c) update the first weight associated with the first media type based on a search result selected by a user from a set of search results that were identified to the user in response to a query from the user, thereby producing an updated first weight, wherein the selected search result indicates a multimedia item having a feature being of the first media type and being associated with the keyword; and (d) update the relevance of the keyword using the updated first weight.

In another aspect, this disclosure describes a computer program product comprising a non-transitory computer readable medium storing computer instructions for adaptive indexing of content. In some embodiments, the computer instructions include: (a) instructions for identifying a keyword associated with a feature found in a data portion of a multimedia item, the feature being of a first media type, and the first media type being associated with a first weight; (b) instructions for determining a relevance for the keyword using said first weight; (c) instructions for updating the first weight associated with the first media type based on a search result selected by a user from a set of search results that were identified to the user in response to a query from the user, thereby producing an updated first weight, wherein the selected search result indicates a multimedia item having a feature being of the first media type and being associated with the keyword; and (d) instructions for updating the relevance of the keyword using the updated first weight.

The above and other aspects and embodiments are further described herein.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 5 is an example of an SSD table created by the indexing client, according to some embodiments.

FIG. 7 is a logical diagram illustrating server-side indexing data, according to various embodiments.

DETAILED DESCRIPTION

Figure 1:
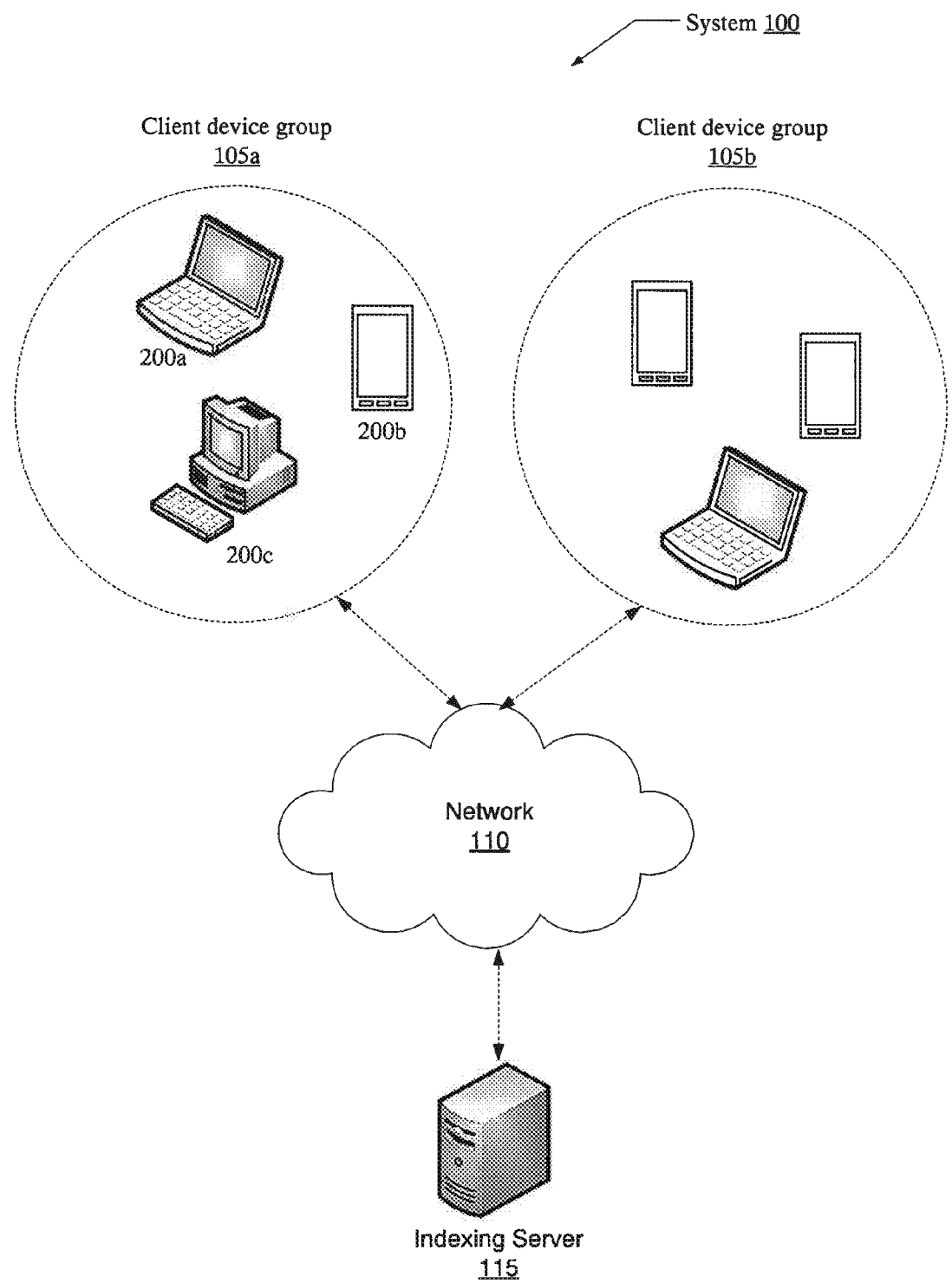
FIG. 1 is a network diagram illustrating some hardware components of a system configured to perform content indexing, according to various embodiments.

In recent years, there has been a proliferation of client devices capable of creating or obtaining content items. Such client devices include smartphones, tablet computers, laptop computers, digital cameras, and other computing devices. The proliferation of such client devices has created a new environment where an ever-growing share of content items contain non-textual data (e.g., image data, video data, and/or audio data) and such content items are stored remotely on distributed client devices.

In the new environment, traditional search and retrieval techniques are inadequate. First, traditional indexing techniques are ill-suited for indexing non-textual content (e.g., image data, video data, audio data, multimedia data). Having been developed for textual content (e.g., ASCII data), traditional search engines, with respect to non-textual content, often index only textual metadata, such as a content item's filename, and ignore the non-textual data stored in the file. Such an approach is inherently limited because it considers only secondary indicators and ignores primary content.

Second, search and retrieval techniques have not been adequately adapted to leverage an environment where content items created by and stored on distributed end-user client devices. Although traditional indexing techniques might consider metadata associated with content items (e.g., Global Positioning System (GPS) information, filename, etc.), they largely overlook the potential of metadata that could be associated with the client device used to capture and/or store the content items.

According to various embodiments, a search engine may be configured to facilitate effective search and retrieval functionality in the new environment, where distributed client devices create and/or store content items including non-textual content. Some embodiments of the systems and techniques disclosed herein may address one or more of the shortcomings discussed above by building a search index based on non-textual content of content items and/or utilizing device specific data to determine content relevance.

In some embodiments, indexing software is provided and may comprise a client software component for execution on client devices (e.g., cameras, laptops, smartphones, etc.) and a server software component for execution on an indexing server. The client software component may be configured to automatically detect content items created (or otherwise obtained) by the client device on which the client software component runs and to analyze that content item. In some embodiments, the analysis may depend on characteristics of the client device, such as the device's type, the content stored on and/or previously created using the device, and/or on one or more user-specified settings. The client software component may report the content and analysis results to the server software component, which adds the results to a content index.

In some embodiments, the server software component may maintain a separate content index for different groups of devices. For example, members of a family may register their respective client devices with the server as a single group. The server may be configured to maintain a separate index for that group of devices and to allow members of the family to query the group's index. Thus, the family members may query and discover content items across their respective client devices.

FIG. 1 is a network diagram illustrating some hardware components of a system configured to perform multimedia indexing (e.g., indexing of textual and non-textual content), according to various embodiments. According to the illustrated embodiment, system 100 comprises two client device groups 105a and 105b connected to indexing server 115 via a network 110, which may be a public network (e.g., the Internet), a private network, or some combination of the two. Each client device group 105 includes at least one client device 200.

The client device groupings 105 may be formed logically by registering various client devices with an indexing service (e.g., implemented on indexing server 115). For instance, a family that wishes to share a content index for content items stored on their multiple client devices may have registered the three client devices in logical group 105a. In the illustrated embodiment, device group 105a includes a laptop computer 200a, a desktop computer 200b, and a smartphone 200c. A device group may include any number of client devices capable of storing content items and accessing network 110. Furthermore, any number of client device groups is possible.

Each client device 200 in groups 105 may execute an indexing client application 215 (or indexing client 215 for short) (see FIG. 2), which may execute in the background and/or be invoked on demand. The indexing client 215 may monitor the client device 200 for new and/or modified content items. In response to finding a new or modified content item, the indexing client 215 may analyze the content of the content item and report its analysis to the indexing server 115. For example, when a new picture (e.g., image file) is loaded onto the personal computer 200c in group 105a, the indexing client 215 executing on personal computer 200c may detect the new picture, analyze it to identify various features, and send the analysis results over network 110 to indexing server 115. The analysis results and detailed methods for performing the analysis are discussed below in relation to FIG. 4.

Network 110 may correspond to any type or combination of communication networks, including local-area networks, wide-area networks, wireless networks, cellular networks, etc. Without loss of generality, network 110 may be described herein as the Internet.

Indexing server 115 may correspond to any number or type of computers usable to execute the indexing server component. For instance, indexing server 115 may correspond to a single computer, a cluster of computers, a distributed architecture, and/or any other hardware configuration usable to implement the indexing functionality described herein.

Software executing on indexing server 115 may maintain a logically separate index for each group of devices. That is, when indexing server 115 receives content analysis from a device in group 105a, the indexing server may update only the index corresponding to device group 105a. Similarly, when indexing server 115 receives a query for content from a client device in group 105a, the indexing server 115 may satisfy the query using the index corresponding to that group (i.e., not using an index corresponding to another group).

Figure 2A:
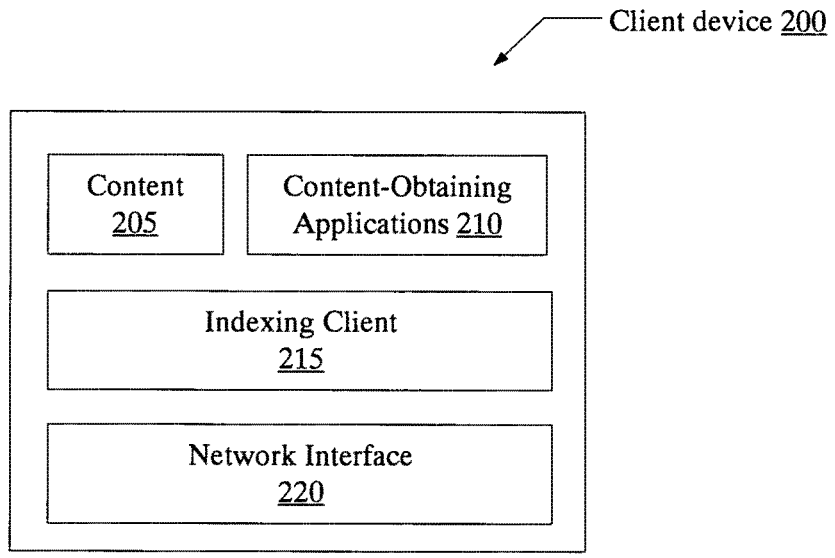
FIG. 2a is a block diagram illustrating the logical components of a client device, according to some embodiments.

FIG. 2a is a block diagram illustrating the logical components of an example client device 200, according to some embodiments. Client device 200 may correspond to any device capable of storing content items, such as any device in groups 105 of FIG. 1. As used herein, the term "device" refers to any client device, such as client device 200, that is capable of storing content items (e.g., 205) and executing an indexing client (e.g., 215), as described herein.

According to the illustrated embodiment, client device 200 includes one or more content-obtaining applications 210, which are usable to create or otherwise obtain content items 205. Content items 205 may include pictures, movies, audio recordings, text files, and web pages or other multimedia items. Content-obtaining software 210 may include any programs or applications for creating content (e.g., picture software, movie software, hardware drivers, etc.) or for otherwise obtaining content (e.g., web browser with which files may be downloaded, driver software for a hardware device through which files may be received, etc.).

Client device 200 may also include indexing client 215, which may facilitate the indexing of content items 205 on indexing server 115115. In various embodiments, indexing client 215 may be configured to monitor content items 205 for changes (e.g., new files, modified files, etc.), to analyze the new/updated content, and to report the analysis results to indexing server 115 115 through a network interface, such as 220. Network interface 220 may include any networking software and/or hardware that enables indexing client 215 to communicate with a remote indexing server over a network.

In some embodiments, the analysis results sent to the indexing server may comprise "structure-searchable data" (SSD), as described herein. Among other types of information, SSD may include device-specific weight parameters, which may be based on the device type, on content items 205, on user-specified parameters, and/or on other types of device-specific information.

Figure 2B:
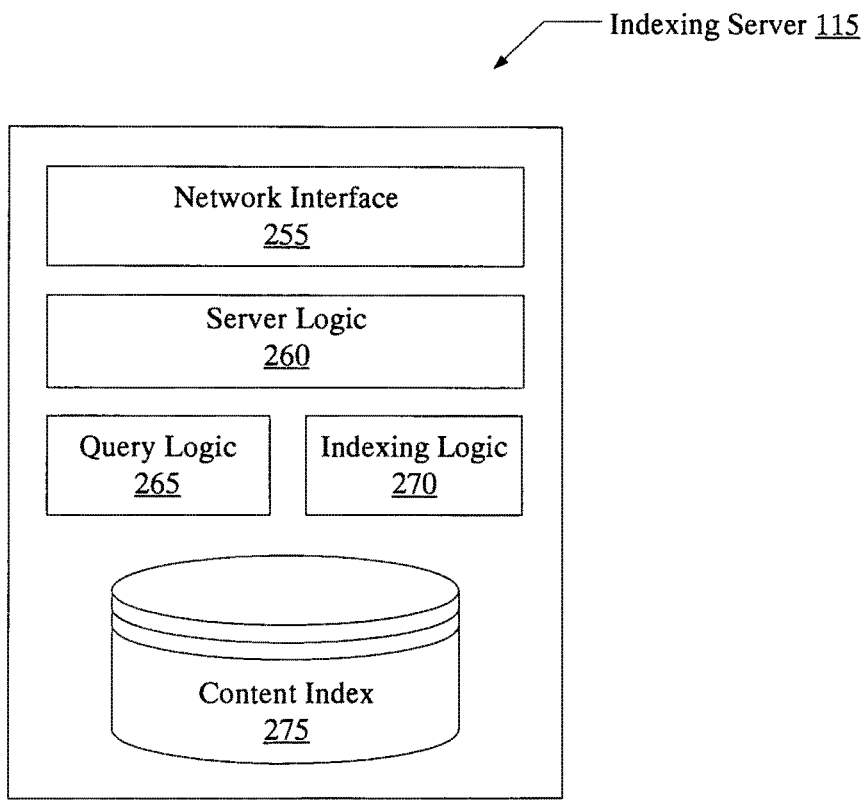
FIG. 2b is a block diagram illustrating some logical components of an indexing server, according to some embodiments.

FIG. 2b is a block diagram illustrating some possible logical components of an example indexing server 115, according to some embodiments. In various embodiments, the functions of indexing server 115 may include maintaining an index of content stored at remote devices and satisfying queries for that content based on the index.

According to the illustrated embodiment, indexing server 115 includes a network interface 255, which enables the server to communicate with client devices, such as 200, over a network.

Indexing server 115 may include server logic 260, which may be configured to receive requests from client devices and to service those requests. For example, server logic 260 may include a web server, web application server, web application(s), and/or any number of other remote service components. To accept requests from client devices, server logic 260 may expose various interfaces, such as various web services and/or other programmatic APIs that may be invoked by indexing client 215.

In response to receiving a request for service, server logic 260 may invoke one or more backend components, such as query logic 265, indexing logic 270, and content index 275. In various embodiments, backend components 265-275 may be implemented as part of one or more web applications, as separate libraries, and/or as any other combination of software.

In the illustrated embodiment, indexing server 115 includes indexing logic 270, which may be configured to analyze SSD received from indexing clients (e.g., 215) executing on one or more remote devices. In response to receiving SSD from a given device, indexing logic 270 may determine the group to which the device belongs and identify group-specific indexing parameters, as described herein. Indexing logic 270 may then use the group-specific indexing parameters and received SSD to update content index 275. In some embodiments, the group-specific weight parameters may include group-specific weights for different feature types in the content.

Indexing server 115 may include query logic 265, which may be configured to query content index 275 in response to client requests. For example, server logic 260 may receive a query for content from client 200. The query may specify various parameters describing the content, such as one or more keywords. In response to receiving the query, server logic 260 may invoke query logic 265. Query logic 265 may respond by querying content index 275 to discover content items that best matches the client's query. In response to identifying the most appropriate content items, query logic 265 may notify server logic 260 of the content items, and sever logic 260 may forward indications of the content items back to the client device. A method for servicing a client query (e.g., locating and returning an indication of content items responsive to the query) is discussed below in relation to FIG. 8.

In various embodiments, content index 275 may be implemented in many forms. For example, content index 275 may be implemented as one or more files one one or more file systems, as one or more databases, as in-memory objects that are periodically written back to persistent storage, and/or any other index implementation.

The components of client device 200 and indexing server 115 are broken out logically in FIGS. 2a and 2b for explanatory purposes. In various implementations however, functionality of different components may be broken down further and/or combined. It is intended that this disclosure cover all such embodiments.

Figure 3:
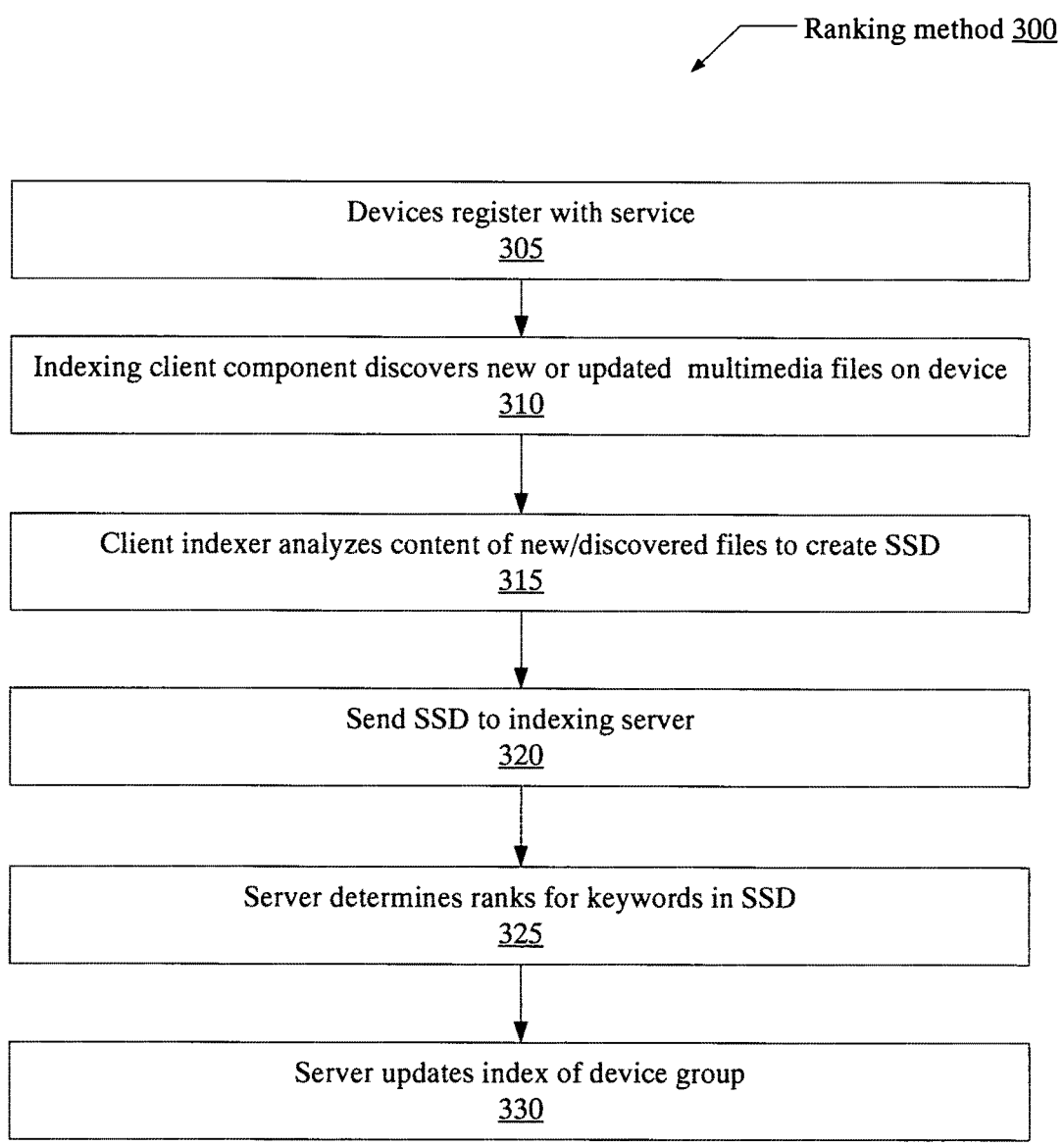
FIG. 3 is a flow diagram illustrating a method for creating and maintaining a centralized index of distributed content, according to some embodiments.

FIG. 3 is a flow diagram illustrating an indexing method 300 for creating and maintaining a centralized index of distributed content items, according to some embodiments. Indexing method 300 may be implemented by a combination of client and server components, such as indexing client 215, server logic 260, and indexing logic 270.

According to FIG. 3, indexing method 300 begins in 305 when one or more users register devices with the indexing service. For each device, registration step 305 may include downloading indexing client 215 onto the client device 200 and/or installing the indexing client 215 onto the client device 200. In some embodiments, registration step 305 may comprise creating authentication credentials (e.g., username/password), specifying a group of devices to which the device belongs, and/or other setup steps.

Device groups correspond to groups of devices whose owners wish to share content stored on those devices. For instance, members of a family may register their devices as one group in order to share pictures stored on those devices. To enable sharing and searching of content across multiple devices in a group, the indexing server may create a logically separate index for the content in each group. One or more users of devices in the group may set group-specific indexing parameters to guide the indexing logic (e.g., 270) in creating and maintaining the group's index.

In step 310, the indexing client 215 discovers new or updated content items, such as picture or movie files or web pages. In some embodiments, the indexing client 215 may be configured to search (periodically or on demand) one or more storage locations (e.g., file system directories) for new or recently updated items. A new or updated item may correspond to an item that has been created, stored, modified after the client's most recent report to the indexing server.

In 315, indexing client 215 analyzes the content of the new/updated items to create "structure-searchable data" (SSD). As used herein, the term "structure-searchable data" corresponds to data that identifies various "features" found in the "data portion" (or "body") of a content item. For example, a content item may have a header for storing metadata and a body for storing data. Some content items (e.g., a web page) may comprise a set of one or more individual files or object. Thus, when we refer to a "data portion" of such a content item we refer to the data portion of each individual file/object that is a part of the content item.

The term "feature" refers to, for example, any identifiable aspect of the data in the body of the item that can be used to index the content item and thereby to determine the relevance of the content item to a user query. Examples of features may include particular images, sounds, text, voices, or other features present in the data.

In many embodiments described herein, SSD includes respective keywords associated with each identified feature and device-specific indexing parameters. Device-specific indexing parameters may affect the way in which the server's indexing logic uses the SSD to update the device group's index. For example, in various embodiments, the SSD may specify one or more device-specific weights. An example of a method for creating SSD is described in more detail with relation to FIG. 4.

In step 320, the indexing client 215 sends the SSD to the indexing server 115 for incorporation into the device group's index. Subsequent steps 325 and 330 may therefore be performed by indexing server 115 (e.g., using indexing logic 270).

In 325, indexing server 115 analyzes the SSD to determine the relevance of various keywords to the features identified in the SSD. In some embodiments, the SSD already indicates the keywords and the features and/or feature types with which each keyword was associated. In such embodiments, the server need only determine the relevance of each keyword to the content containing the associated features. In some embodiments, the relevance determination step of 325 may depend on device-specific parameters and/or on group-specific parameters. A detailed method for determining relevance of keywords is discussed with relation to FIGS. 6-7.

In 330, the indexing server 115 updates the device group's content index to reflect the received SSD data and relevance determinations. Thus, method 300 is operable to create and update a content index, which can later be used to query distributed content items.

Figure 4:
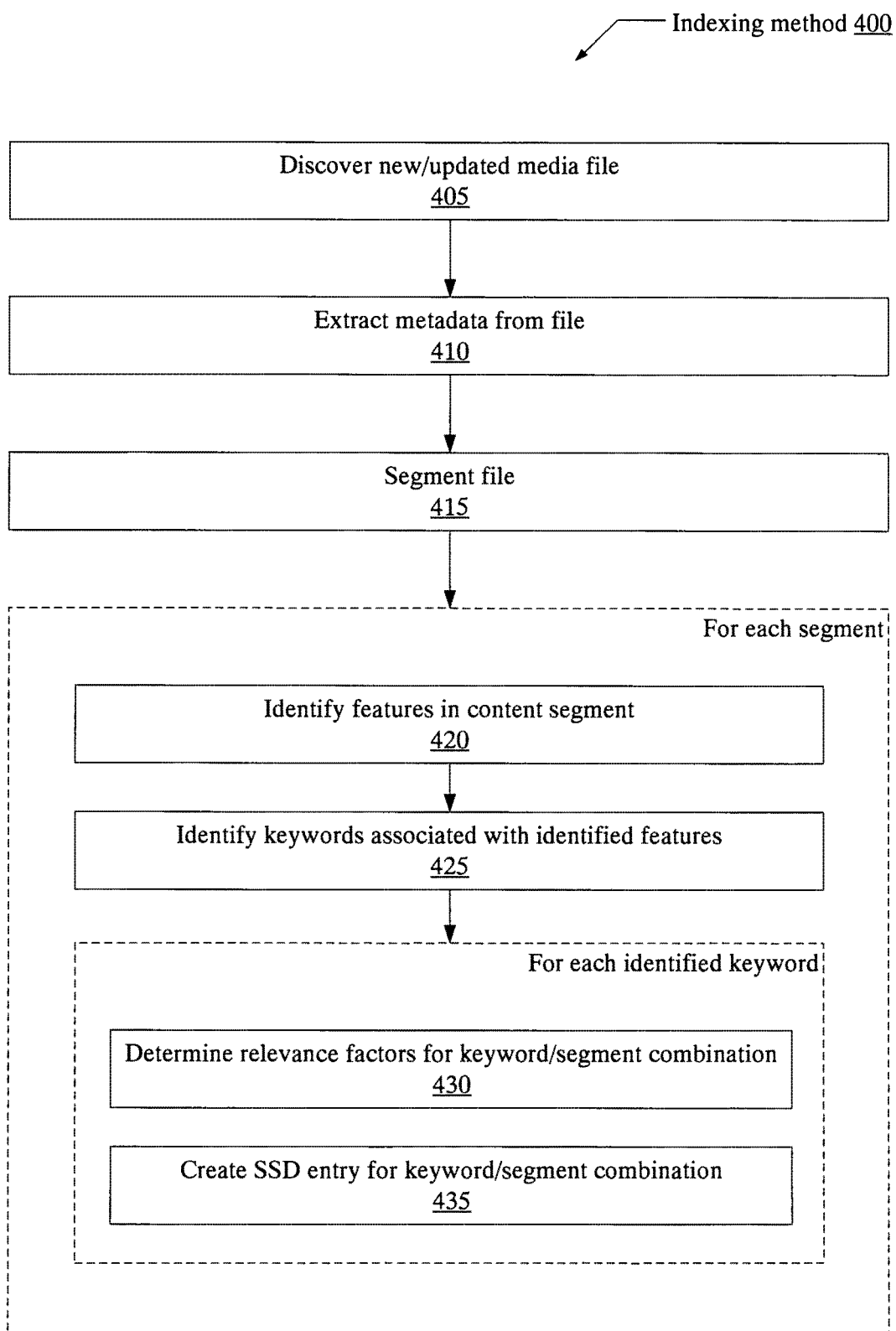
FIG. 4 is a flow diagram illustrating a method for analyzing content items to create SSD, according to some embodiments.

FIG. 4 is a flow diagram illustrating a method 400 for analyzing data to create SSD, according to some embodiments. Method 400 may be performed on a client device by an indexing client component, such as 215 of FIG. 2. Method 400 may correspond to a more detailed view of steps 310 and 315 of FIG. 3.

Method 400 begins when indexing client 215 discovers a new or updated file, as in 405, containing data and metadata. As described above, indexing client 215 may be configured to monitor a given directory for new/updated files and/or may be invoked manually. For purposes of explanation, the file in the examples below is a movie file containing audio and/or video (audio/video) data. However, it should be noted that the techniques described herein are applicable to any content item.

In 410, the indexing client 215 extracts metadata from the file. Such file metadata may include date/time, location, file name, user-generated tags, and/or other secondary indicia of the file' subject matter.

In 415, the audio/video data is segmented. For example, the data may be segmented (e.g., by time, scene, etc.) into multiple time frames. In such embodiments, the time frames may be of a predefined length (i.e., static) or of a length that varies depending on file attributes (i.e., dynamic). The length of a dynamic time frame may be vary depending on different attributes, such as the overall length of the movie, the number of features identified in each segment, degree of feature change, and/or other characteristics. For example, a movie may be segmented into contiguous segments such that there is at least a minimum degree of difference between the features of each segment. Dynamic segmentation may also combine various criteria (e.g., minimum degree of difference and minimum length).

For each segment, the indexing client 215 executes steps 420-435. In 420, the indexing client 215 analyzes the segment to identify features that appear in the segment. As noted above, the term "feature" may refer to any recognizable pattern within the data of the segment that can be associated with a keyword. A feature may be of any of various media types, such as a visual feature (e.g., image of a bird), an audio feature (e.g., call of the bird), a textual feature (e.g., image text describing the bird), a voice feature (e.g., narration describing the bird), or others.

In 425, the indexing client 215 identifies keywords associated with the features identified in 420. For example, if an identified feature is an image of a pelican, the feature may be associated with the keywords "pelican", "bird", "animal", "beak", and/or other keywords.

To identify features (as in 420) and associate those features with keywords (as in 425), the indexing client 215 may employ various artificial intelligence techniques, including image recognition, face recognition, voice recognition, sound recognition, pattern recognition, and/or other techniques. Many such techniques are known in the art and any combination of such known and/or future techniques may be utilized. For example, video shot segmentation may be performed using known digital video retrieval techniques. In some embodiments, keywords associated with those features may be determined using known machine learning techniques, such as support vector machines (SVM), and/or statistical approaches, such as hidden markov models (HMM) and Bayesian Belief Networks (BBNs). In some embodiments, Audio feature detection may be performed by known voice recognition techniques.

Once all the features in the segment have been identified and associated with one or more respective keywords, the indexing client 215 may evaluate each keyword to determine relevance factors and to create an SSD entry for the keyword/segment combination. The iteration over each keyword associated with the segment is indicated by the dashed box.

In 430, the indexing client 215 determines one or more relevance factors for the keyword. The particular relevance factors may vary across embodiments. For instance, in some embodiments, the relevance factors of 430 may include an indication of the types of features (e.g., image, text, voice, sound, etc.) with which the keyword was associated in 425.

In some embodiments, the relevance factors may include a prominence score indicating how prominently the features associated with the keyword are present in the segment. Such a prominence score may be based on any number of factors, such as duration of a feature, whether a feature appeared in the foreground or background, and/or others.

In some embodiments, the relevance factors determined in 430 may include a confidence interval (i.e., degree of confidence) indicating how strongly the keyword is correlated with the associated features. For example, the confidence interval may be expressed as a faction between 0 and 1. When a manual scan or automatic algorithm indicates the utmost confidence that the keyword can be associated with its respective features, the confidence interval may be 1. A scan or algorithm with lower confidence may indicate a confidence interval of 0.5 and so forth.

In some embodiments, the relevance factors determined in 430 may be based on one or more characteristics of the client device 200 (i.e., "device-specific characteristics"). Such device-specific characteristic may dependent on any number of factors, such as the type of device, user-specified device weights, other content stored on the device, and/or others. For instance, the indexing client 215 may determine a factor based on device type by attaching higher weight to pictures taken by cameras than to pictures taken by laptops. In another example, the indexing client 215 may determine a factor based on user-specified weights by allowing users to set the overall importance of media stored on the given device or of a given type of media stored on the given device.

In some embodiments, the indexing client 215 may calculate a device-specific relevance factor for a given keyword based on other content items 205 stored on the client device 200. For instance, the indexing client 215 may track the features and keywords associated with other content items 205 stored on and/or created by the client device 200. The indexing client 215 may then assign greater weight to keywords and/or features that are frequently associated with other content on the same device. For example, if a particular camera stores many pictures of its owner's son Olle, it is more likely that new pictures found on the device will also be of Olle. Accordingly, when the indexing client 215 on the device associates the keyword "Olle" with a new picture, the client may recognize that the keyword is also associated with many other pictures on the device, and in response, attach a high device-specific weight to the particular keyword.

In 435, the indexing client 215 records the SSD data for the keyword/segment combination in an SSD data structure. In some embodiments described herein, the SSD data structure for a keyword/segment combination is an entry in an SSD table, as illustrated in FIG. 5. However, it should be recognized that the SSD table is exemplary only and that the same data can be stored in other configurations in other embodiments.

FIG. 5 is an example of an SSD table created by the indexing client 215, according to some embodiments. The table may correspond to SSD that a client derived by processing a given multimedia item, such as a multimedia file (i.e., a file containing more than one type of data—e.g., a file containing video data and audio data, a file containing audio data and text data, a file containing video data, image data, text data, and audio data, etc.) or a set of two or more associated files where at least one the files stores non-textual data (e.g., audio/video data), according to method 400. In the example described below, the multimedia item is a multimedia file.

In the illustrated embodiment, each row of the SSD table represents a respective entry corresponding to a given keyword/segment combination. The indexing client 215 may record such an entry in step 435 of method 400. In various embodiments, the indexing client 215 may send each row separately or may optimize the transmission by sending a collection of rows together and omitting redundant data.

Each SSD entry in table 500 includes fifteen fields. Fields 1-3 contain metadata of the file from which the SSD was derived. The indexing client 215 may have gathered such data from the file in step 410 of method 400. In the illustrated example, the metadata includes the name of the file, the date at which the file was created or modified, and the location where the file was created (e.g., GPS data). In other embodiments, the SSD entry may contain any other file metadata.

Fields 4 and 5 contain metadata that identify the origin of the file, including the user and device that has sent the SSD entry. The UID field may contain a username identifying the user who created the file and/or the username of the user who submitted the SSD entry. The DevID field may identify the particular device used to capture or store the media file. For example, in the illustrated embodiment, the file was captured using a device assigned the identifier "myPhone." In various embodiments, any other metadata describing the origins of the file may be sent. For example, such metadata may identify the device that created the file and/or the SSO, the owner of such devices, the operator of such devices, etc.

Fields 6 and 7 indicate the segment and keyword. The segment field indicates the file segment to which the entry corresponds. The keyword field indicates a keyword that the indexing client 215 associated with one or more features in that segment (e.g., in steps 420-425). The combination of file-segment-keyword for a given entry is therefore unique across all entries. That is, each entry describes the relationship of a given keyword to a given segment of a particular file.

Fields 8-11 indicate whether or not a given type of feature in the file segment has been associated with the keyword. For example, in segment 1, the keyword "Lisa" has been associated with at least one image feature and at least one voice feature. In segment 2, the same keyword was associated with a text feature and with a voice feature. In some embodiments, the entry may further include a dominant defining characteristic of each type of feature. For example, if the file segment contains a video type feature and color is the defining characteristic for video, then the entry may include an indication of the dominant color of the video feature (e.g., blue). In another example, if the file segment contains an audio feature and tonality (or sharpness, roughness, etc.) is the defining characteristic for audio feature, then the entry may include an indication of the dominant tonality for the audio feature.

Fields 12-14 indicate relevance factors for the keyword (e.g., those determined in 430 of method 400). In the illustrated embodiment, the relevance factors include a feature prominence (Prom), a confidence interval (WRel), and a device-specific weight (WFact), as described above. For instance, the prominence field (Prom) may indicate the number of seconds during which the features associated with the keyword were present. The confidence interval (WRel) may indicate the confidence with which the keyword was associated with the indicated features. In the illustrated embodiment, WRel is represented as a fraction between 0 and 1. The device-specific weight (WFact) may indicate an increased weight for keywords that are heavily represented on the device. In the illustrated embodiment, the WFact weight is represented as a scaling factor between 1 and 2. Additional fields containing additional relevance factors calculated by the client are possible. Finally, field 15 is the relevance score, which indicates the relevance of the keyword to the file segment. In some embodiments, the indexing client 215 may leave the relevance score field blank, permitting the indexing server 115 to determine the relevance score based on the SSD's relevance factors and on one or more parameters specific to the device group. The group-specific parameters may be stored on the indexing server 115 and applied uniformly to all SSD entries received from devices in the group.

In some embodiments, an SSD entry may include additional fields not shown in table 500. For instance, a quality factor (WQual) indicating the media quality of the segment may be included, which may be based on MOS (Mean Opinion Score) for the segment and normalized within a given range (e.g., 0-1). In such embodiments, the MOS may be calculated using a parametric audiovisual model, such as the P.NAMS model from ITU (currently being standardized in SG12 Q14 of ITU-T).

Figure 6:
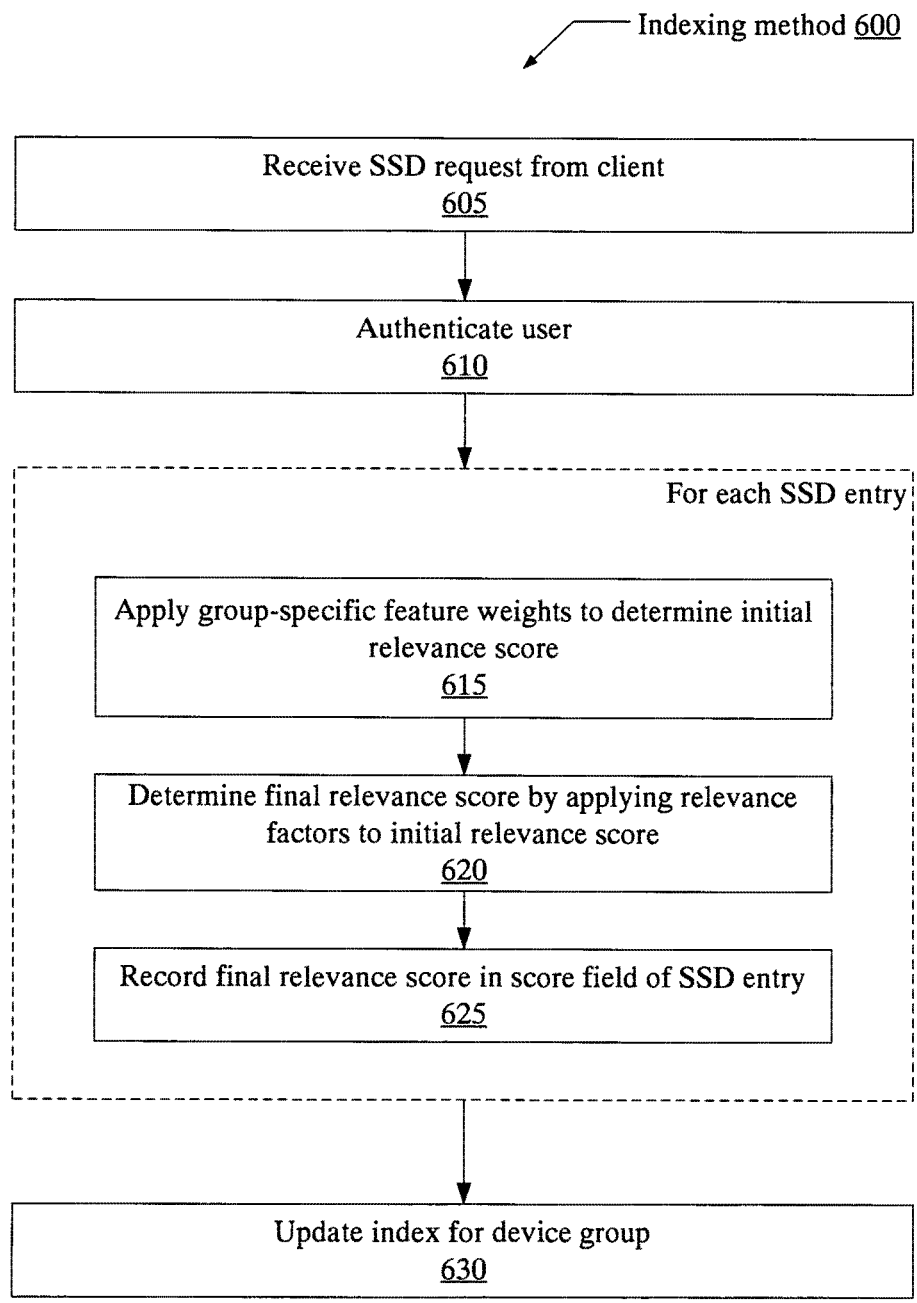
FIG. 6 is a flow diagram illustrating a method by which an indexing server may determine a relevance score for an SSD entry gathered from a remote device, according to some embodiments.

FIG. 6 is a flow diagram illustrating a method by which an indexing server 115 may determine a relevance score for an SSD entry gathered from a remote device, according to some embodiments. Method 600 may be performed by an indexing server, such as indexing server 115 using indexing logic 270.

Method 600 begins in 605 where the indexing server 115 receives SSD from indexing client 215 on a given device 200. The SSD may include any number of SSD entries, such as those of table 500. For example, the indexing server 115 may receive a message from indexing client 215 that includes data representing a given SSD entry (e.g., given row of SSD table 500). Such a message, which may be in the form of an HTTP message, may include a respective field for various columns of the SSD entry, such as a file identifier field, a date field, a location field, a UID field, a DevID field, a segment field, a keyword field, an img field, a text field, a sound field, a voice field, a prom field, a WRel field, a WFact field, and/or other fields. In some embodiments, the indexing server 115 may receive the SSD in 605 through a programmatic web API (e.g., web service, RESTful service, etc.). The SSD request of 605 may include authentication information (e.g., username, password, etc.), which may be authenticated in 610 to identify the appropriate account.

Once the indexing server 115 has received an SSD request and authenticated the requesting user, the indexing server 115 may iterate over the received SSD entries and calculate a respective relevance score for each. The iteration is indicated in FIG. 6 by the dashed box.

In various embodiments, a device group may be associated with a respective set of weights, where each weight corresponds to a different feature type (e.g., image, sound, text, voice, etc.) and reflects how important that type of feature is to the relevance of a keyword. In various embodiments, the weights may be default presets, user-defined, dynamically determined, and/or determined in other ways. Each device group may be associated with a respective set of feature type weights.

In 615, the indexing server 115 identifies the group-specific feature weights associated with the device group to which the sending device belongs and uses those weights to determine an initial relevance score for the keyword. For example, in some embodiments, the indexing server 115 may determine an initial relevance score for a given entry by summing the weights of every type of feature denoted in the entry. Thus, if a given entry indicates that the keyword was associated with a visual feature and with an audio feature, indexing server 115 may calculate the initial weight for the entry as the weight assigned to visual-type features plus the weight assigned to audio-type features.

In 620, the indexing server 115 determines the final relevance score by scaling the initial relevance score using the SSD-supplied relevance factors (e.g., Prom, WRel, WFact, etc.). The scaling may correspond to any function of the initial relevance score and SSD-supplied relevance factors. For example, in some embodiments, a final relevance score for an entry in SSD table 500 might be calculated as the (initialScore+Prom)*WRel*WFact. Thus, degrees of prominence, confidence, and/or device-specific relevance may each affect the final relevance score. Although one augmentation function has been proposed here, other functions are possible in other embodiments. Additionally, in embodiments where an SSD entry includes additional factors (e.g., WQual), the final relevance score may be dependent on those factors (e.g., (initialScore+Prom)*WRel*WFact*WQual).

In 625, the indexing server 115 records the final relevance score in the score field of the SSD entry. Once a final relevance score has been determined for an SSD entry, the SSD entry is complete and the indexing server 115 may use the entry to update the logical index associated with the device group.

In some embodiments, the index may be implemented as any combination of in-memory data structures, files in a file system, tables and/or entries in one or more databases, or other storage formats. The index may be used to service queries by correlating keywords with file names and/or segments most relevant to that keyword.

FIG. 7 is a logical diagram illustrating server-side indexing data, according to various embodiments. For clarity, the data is represented three tables. However, it should be understood that in different embodiments, the same data may be arranged differently.

In FIG. 7, SSD table 700 comprises the same data as SSD table 500 of FIG. 5, except that the indexing server 115 has calculated respective relevance scores for each entry. The indexing server 115 may calculate the relevance scores by performing method 600 of FIG. 6. According to method 600, the indexing server 115 first identifies a set of group-specific feature weights, such as those in weight table 710. Weight table 710 lists the weight of each media type for the group. Each entry includes a groupID field because different groups may assign different respective weights to the same media type. Weight table 710 lists only the weights for group "6".

For each entry in SSD table 700, the indexing server 115 calculates an initial relevance score based on the feature types marked in the entry and on the respective weights of those media types as noted in weight table 710. For instance, the uppermost entry in SSD table 700 (i.e., F/1/Lisa) denotes that the keyword "Lisa" is associated with an image-type feature and with a voice-type feature. According to weight table 710, those two feature-types have a weight of 10 and 2 respectively in the group. Accordingly, the initial weight (e.g., calculated in 615) may be a function of 10 and 2 (e.g., 10+2=12).

As in 620, the indexing server 115 may then determine a respective final relevance score for each entry based on the entry's initial relevance score and the relevance factors (e.g., Prom, WRel, WFact) listed in that row. In FIG. 7, the final relevance scores are calculated as (initialScore+Prom) *WRel*WFact.

Once the indexing server 115 calculates the final relevance scores for each entry, the indexing server 115 may add the entries to an index, such as index 720. The index 720 may be optimized for quick retrieval and/or entry. In the illustrated embodiment, index 720 lists for each entry, only the final relevance score and the fields that uniquely identify the entry.

Figure 8:
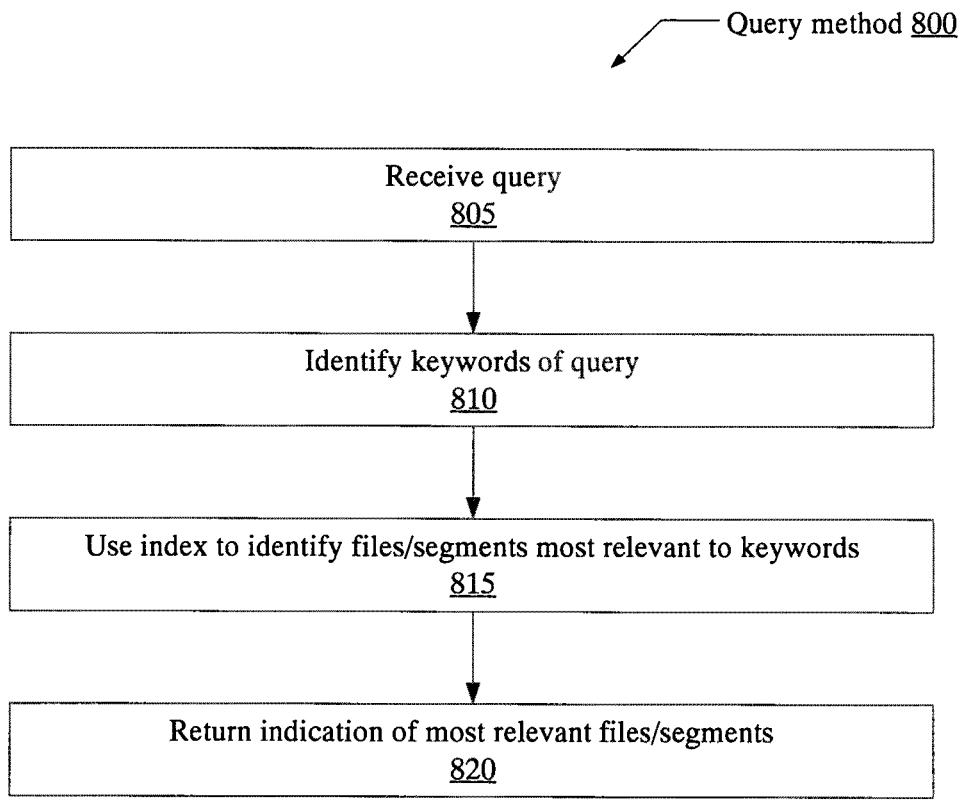
FIG. 8 is a flow diagram illustrating a method for using the index (e.g., index 720) to identify relevant content stored on distributed devices, according to some embodiments.

FIG. 8 is a flow diagram illustrating a method for using the index (e.g., index 720) to identify relevant content items stored on distributed devices, according to some embodiments. Query method 800 may be performed by query logic 265.

According to the illustrated embodiment, query method 800 begins in 805 when the query logic 265 receives the query. As described above, the query may comprise one or more keywords and/or non-textual data. For example, a user may query the database for videos that are similar to a given query video.

In 810, the query logic 265 identifies one or more keywords from the query. If the query is provided in the form of text, then identifying the keywords in 810 may simply involve identifying the keywords indicated by the text. Identifying keywords indicated by text may include parsing the text, interpreting regular expressions, and/or other parsing/interpretation activity. If the query is provided as a non-textual query file (e.g., another movie, a picture, etc.), then identifying the keywords in 810 may comprise extracting features from the query file and identifying keywords associated with the extracted features. The feature extraction may be performed similarly to the feature extraction used to create SSD (e.g., method 400 of FIG. 4).

In 815, the query logic 265 uses the index (e.g., 720) to identify files and/or segments that are most relevant to the identified query keywords. In 820, the query logic returns an indication of the most relevant files and/or segments identified in 815. In some embodiments, the query logic 265 may simply return an indication of the desired content and where it is stored (e.g., which device). In some embodiments, the query logic 265 may send the querying client a URL from which the result may be downloaded or streamed to the querying device.

Several configurations are possible for different embodiments where the indexing server returns a URL. For example, in some embodiments, each client device in a given group may be configured to execute client-side software (e.g., indexing client 215) that makes files stored on the client device accessible via a URL. Each client may thus execute a type of server software that makes the stored files accessible from other devices on a local area (or wide area network). In various embodiments, local area URLs may be created, assigned, or otherwise facilitated by a coordinating server residing on the local area network.

In some embodiments, each client device in a given group may be configured to execute client-side software (e.g., indexing client 215) that automatically uploads files stored on the client device to a storage server. The storage server may be a server on a local area network (e.g., a family's local WiFi network) or a server on a wide area network (e.g., a cloud storage service). In various embodiments, client devices may be configured to automatically upload new files to the storage server when the files are created, in set intervals, and/or on demand. For embodiments configured for on-demand upload, the storage server (or other query handling controller) may request that a given file be uploaded to the storage server from a given client device in response to determining that a querying client device has requested the file. Thus, the storage server may act as an intermediary for conveying files among different devices in a group.

Figure 9:
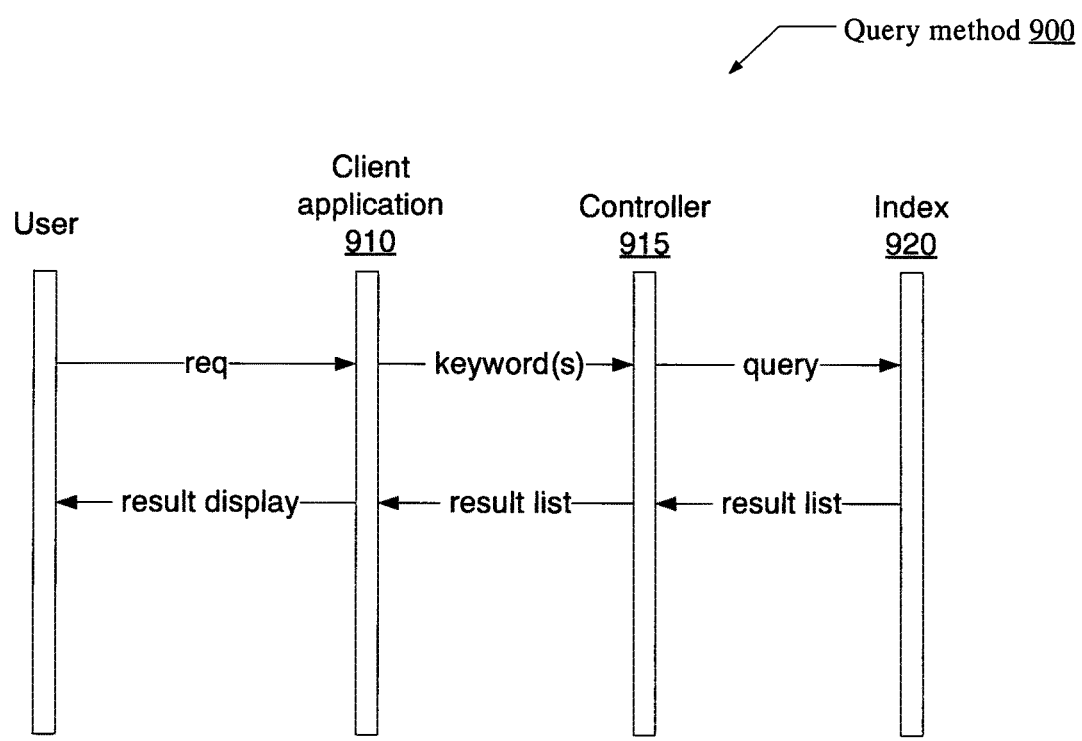
FIG. 9 is a sequence diagram illustrating interactions between various components during execution of a query, according to some embodiments.

FIG. 9 is a sequence diagram illustrating interactions between various components during execution of a query, according to some embodiments. In various embodiments, different components may be distributed and/or on the same physical machine. Accordingly, different messages illustrated in FIG. 9 may be sent using local interrupts, signals, networking protocols, and/or others.

According to the illustrated embodiment, query method 900 begins when a user enters a request into a client application 910, which may be executing on a client device (e.g., 200). In various embodiments, the client application may be implemented as a standalone application, a web application, a web portal, or any other suitable mechanism for delivering application functionality to a user. In some embodiments, the client application may display a graphical user interface (GUI) by which a user may enter queries and receive result lists of matching files.

According to the illustrated embodiment, client application 910 may respond to receiving the request by extracting one or more keywords and sending those keywords to a server for processing. The server may be on the same local area network as the client application, across the Internet, or in any other location with which client application 910 can communicate. The server may be executing a controller component, such as controller 915. The controller component 915 may be configured to process requests from client applications and to provide responses to those applications.

In the illustrated embodiment, controller 915 queries index 920 for files matching the keywords. In some embodiments, index 920 may correspond to an index built using the previously described methods, such as index 720. The index may be found locally on the same server as the controller or may be served by a separate indexing server.

According to FIG. 9, the controller 915 uses the index 920 to determine a result list of candidate files to return to the user. The controller returns the result list to the client application 910, which displays the results to the user. As described above, the result list may comprise a listing of files/segments and their locations. In some embodiments, the result list may include a respective URL for each result. In some such embodiments, a user may select a URL to view and/or download the corresponding file.

Figure 10:
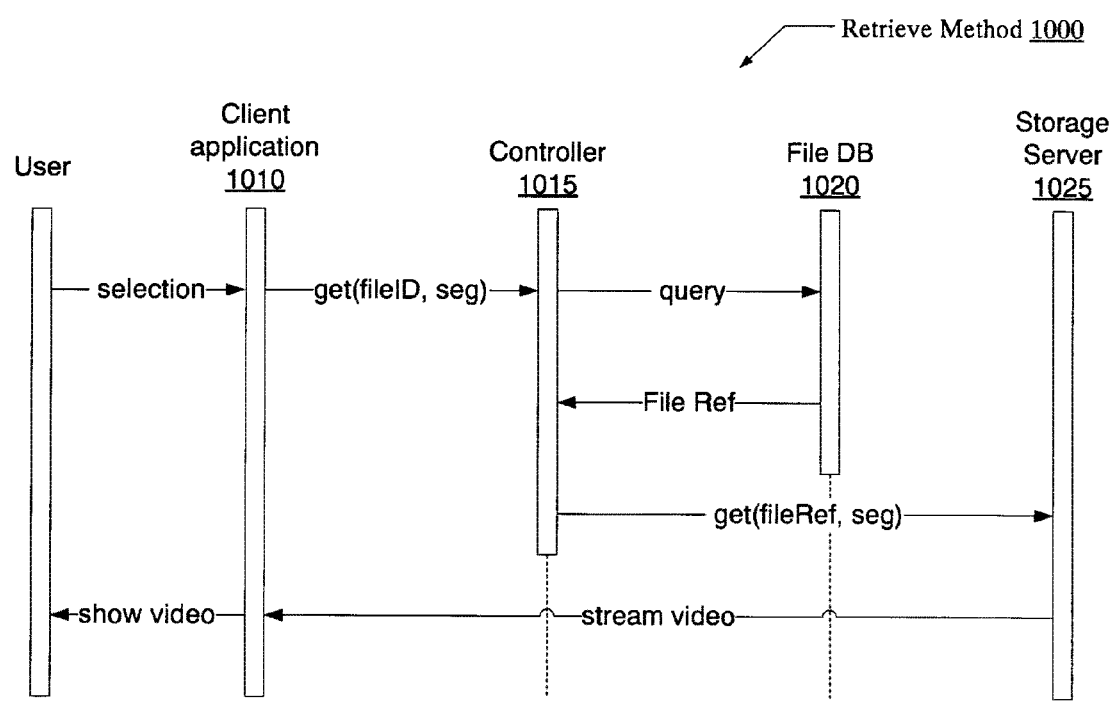
FIG. 10 is a sequence diagram illustrating the interactions between various components performing a method of retrieving a selected file, according to some embodiments.

FIG. 10 is a sequence diagram illustrating the interactions between various components performing a method of retrieving a selected file, according to some embodiments. Retrieve method 1000 may be executed in response to a user selecting a file from a result set displayed by client application 1010 (e.g., as in FIG. 9).

According to the illustrated embodiment, a user selects a result, such as by clicking on a URL presented by client application 1010. Client application 1010 receives the selection and may request the file from controller 1015 by sending a request, as illustrated. The request may include a file identifier and segment identifier, which together indicate the selected file and segment.

In the illustrated embodiment, controller 1015 sends a query to a file database (DB) 1020. File DB 1020 may store information regarding which files are available, where those files are stored, and/or any other information necessary to locate and retrieve a given file from storage.

In various embodiments, file DB 1020 may be implemented using any suitable store that may be queried or otherwise searched. For example, file DB 1020 may be implemented as a relational database (e.g., RDBMS) or other managed database system. However, any database format may be used, such as key-value store, multi-value, object-oriented, hierarchical, tabular, tuple store, triple store, etc. The format of the query that controller 1015 sends to file DB 1020 may depend on the type of store used to implement file DB 1020. For example, if file DB 1020 is implemented as a RDBMS, controller 1015 may query file DB 1020 using an SQL query.

According to method 1000, file DB 1020 returns a file reference to controller 1015. The file reference includes information the controller needs to locate the selected file. The term "file reference," as used herein, is not intended to limit the data to a particular format, but rather, refers generally to data the controller needs for locating the selected file.

According to the illustrated embodiment, controller 1015 utilizes the file reference and segment data to transfer the requested file from storage server 1025 to client application 1010. In various embodiments and/or instances, controller 1015 may accomplish this transfer differently. For instance, controller 1015 may download the file from storage server 1025 and then forward the file to client application 1010. Alternatively, controller 1015 may instruct storage server 1025 to download the file to client application 1010 or provide the file reference to client application 1010 such that client application 1010 can download the data directly. In the illustrated embodiment, controller 1015 sends a request to storage server 1025 to stream the file directly to client application 1010, which then shows the video to the user.

In some embodiments, it may be beneficial to keep content on client devices and move the content on demand, rather than upon creation. Some benefits may include reduced network bandwidth requirements, reduced storage server capacity requirements, and/or other considerations. In such embodiments, files may be transferred on-demand from one client device to another, either directly or via a storage server intermediary.

Figure 11:
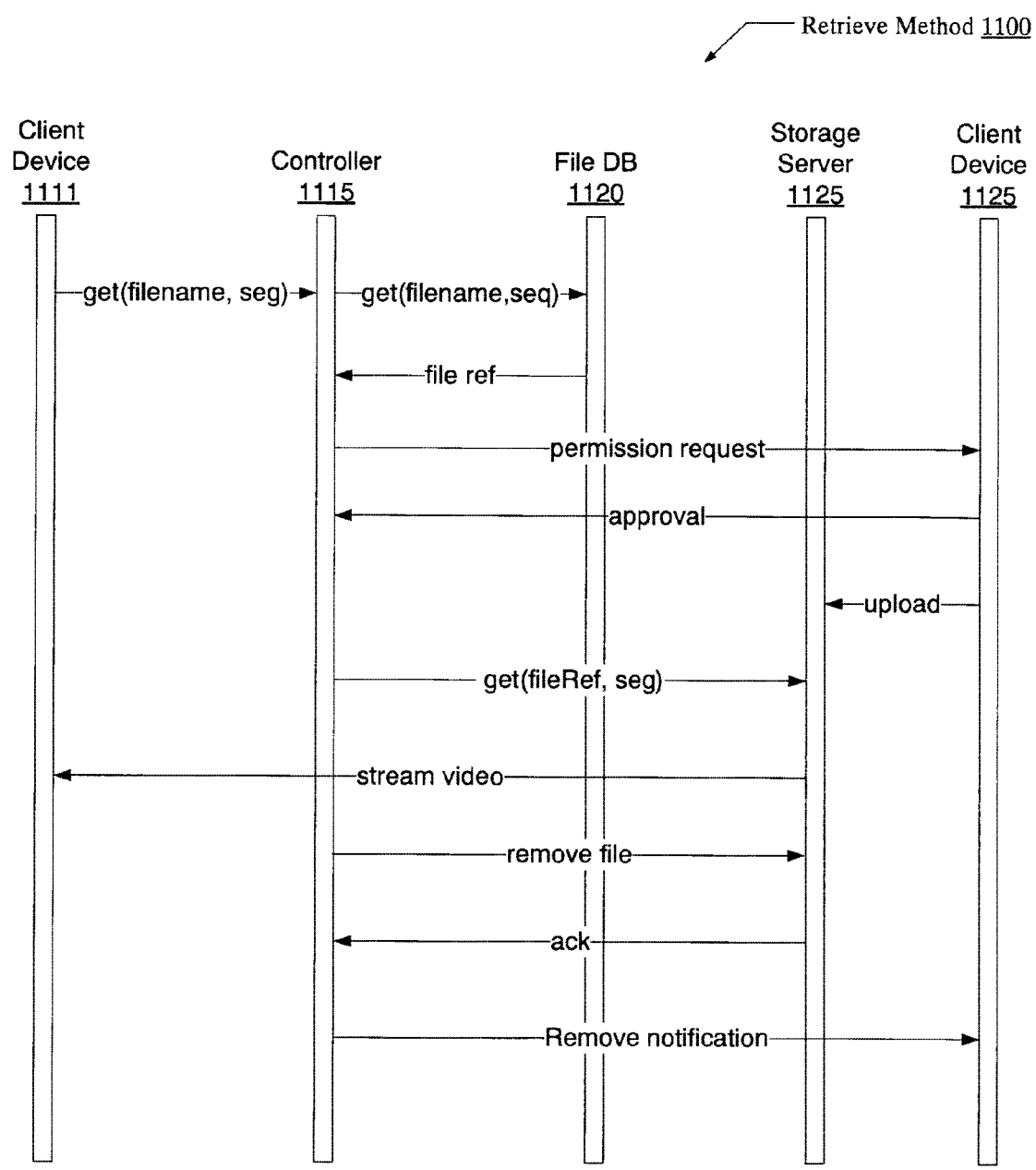
FIG. 11 is a sequence diagram illustrating the interactions between various components for performing on-demand file retrieval via a storage server intermediary, according to some embodiments.

FIG. 11 is a sequence diagram illustrating the interactions between various components for performing on-demand file retrieval via a storage server intermediary, according to some embodiments. Retrieve method 1100 may be performed as an alternative to retrieve method 1000.

According to the illustrated embodiment, client device 1111 (via, e.g., a client application executing on the client device 1111), responds to a user selection by requesting the selected file from controller 1115. As in method 1000, controller 1115 retrieves the file reference from file DB 1120. However, rather than requesting the file from storage server 1125, controller 1115 requests permission directly from client device 1125, where the selected file is stored. Client device 1125 responds to the request by sending controller 1115 an approval message and uploading the requested file to storage server 1125. Controller 1115 then uses the file reference and segment data to request the file from storage server 1125. Storage server 1125 responds by delivering the file to client device 1111. As before, storage server 1125 may deliver the file through various mechanisms, such as streaming.

After the on-demand delivery is complete, various cleanup steps may be performed. For instance, in some embodiments, storage server 1125 may simply remove the file after streaming it to the client device 1111 or after a given timeout period. In the illustrated embodiment, storage server 1125 removes the file in response to receiving a remove request from the controller, and the controller notifies client device 1125 of the removal.

FIGS. 9-11 illustrate methods of servicing a user's requests (i.e., FIG. 9 illustrates a method of servicing a user's query and FIGS. 10 and 11 illustrate methods of servicing a user's file selection request). In these illustrations, the controllers, file DBs, index, and storage servers may be considered server-side components while the client devices and client applications may be considered client-side components. In various embodiments, the server-side components may be hosted on any number of physical machines. For example, controller 1015 may be on the same physical machine as file DB 1020, but on a different physical machine as storage server 1025, which may be part of a distributed storage resource (e.g., storage cluster, cloud storage, etc.). Various other configurations are possible and are within the scope of this disclosure.

In some embodiments, the process of servicing a client request may be utilized to implement various forms of adaptive ranking. Recall that custom rankings are calculated for each device group based on various group-specific factors, such as a group-specific weight table (e.g., 710), and that a group corresponds to one or more users. The term "adaptive ranking," as used herein, refers to any process of modifying a group's or user's index data (e.g., index 720) in response to query and/or selection behavior by that group or user. Through adaptive ranking, various server side components (e.g., controller 1115) may observe a user's or group's behavior to produce more highly customized indexing data and consequently, more relevant search results.

Figure 12:
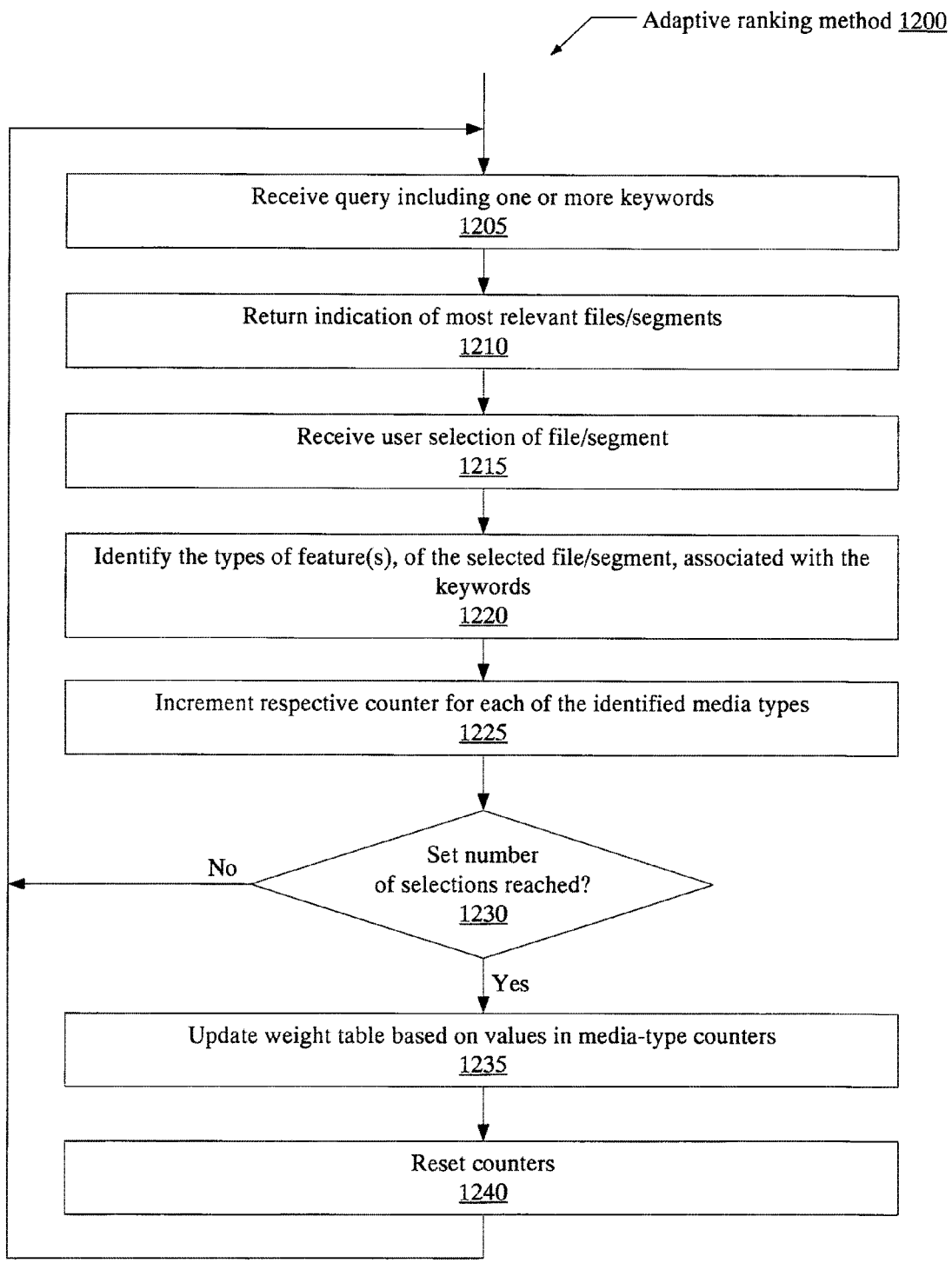
FIG. 12 is a flow diagram illustrating a method for performing adaptive ranking, according to various embodiments.

FIG. 12 is a flow diagram illustrating a method for performing adaptive ranking, according to various embodiments. Method 1200 may be performed by any combination of server-side components involved in the servicing of client requests. For clarity of explanation, these server-side components may be referred to below as simply "the server."

In step 1205 of the illustrated embodiment, the server receives a client query comprising one or more keywords. In response, in 1210, the server returns an indication of the content items or segments determined to be most relevant to those keywords (i.e., a set of search results or "hits"). This indication may take the form of a set of hyperlinks, where each hyperlink in the set points to one of the determined content items or segments. Steps 1205 and 1210 may be performed, for example, according to query method 900 of FIG. 9.

In 1215, the user selects one of the search results (e.g., activates one of the hyperlinks) and the server receives information indicating the user's choice of item/segment, and in 1220, the server identifies the types of features (of the selected item/segment) with which the keywords are associated. For example, if the user's query in 1205 was for movies that are relevant to the keyword "Lisa," then in 1210 the server would return a list of movies/segments that contain features relevant to the keyword "Lisa," and in response to the user selecting one of those movies/segments (in 1215), the server will determine (in 1220) specifically which types of features in the selected movie/segment were associated with the keyword "Lisa." The server can determine the types of the relevant features (in 1220) by searching the SSD table (e.g., 700) for an entry corresponding to the keyword "Lisa" and the selected movie/segment. Given the appropriate entry in the SSD table, the server may determine the relevant feature types by scanning the feature type fields (e.g., Img, Text, Sound, Voice in SSD table 700 of FIG. 7).

In 1225, the server increments a respective counter for each of the media types identified in 1220. For instance, if the keyword "Lisa" were associated with an image feature and a sound feature of the selected segment, then the server may increment a counter associated with the image type and a separate counter associated with the sound type, for the user or group. The server may also increment a counter indicating the number of selections that the user or group has made.

In 1230, the server determines whether the user or group has made a set number of selections since the previous reset. For example, the server may be configured to observe 100 selections from a given user or group before adapting the rankings for that user or group. If the set number of selections has not been reached, as indicated by the negative exit from 1230, the method loops back to 1205. It should be noted however, that the method may also loop back to 1215 if the user selects another result from a displayed list of results without making another query.

If the user/group has made the set number of selections necessary to trigger an update, as indicated by the affirmative exit from 1230, the server updates the user/group's weight table based on the media-type counters, as in 1235. For instance, assume that the set number of selections is 100. In 1235, if the counter associated with the image type is at 80, then for 80 of the previous 100 selections, the keyword was associated with an image-type feature. If the counter associated with the text type is 20, then for 20 of the previous 100 selections, the keyword was associated with a text type feature. In such a case, the server may recognize (in 1235) that image features are more relevant to the particular user or group than are text features. In response, the server may modify the weight table entries for the user or group to reflect the user/group's preference. After the weight table is updated, the server may apply the new weight retrospectively (i.e., automatically update the SSD data and/or index corresponding to the user or group) or prospectively (i.e., apply the new weight to new files/segments as they are added).

Various methods may be employed for modifying the weight table, as in 1235. In one example, the sever may simply modify the weight table to match the preference distribution evidenced by the counters. For example, if twice as many selections were associated with images than with sounds, the new weight value for images would be twice as that for sounds.

In other embodiments, the server may modify the weights to be a function of the counter ratios and ratios of the current weights. For example, if the image counter is 80 and the sound counter is 20, then the counter ratio is 4:1. If the current weights for these feature types are 8 and 4, then the ratio of the current weights is 2:1. In such a case, the server may calculate a new ratio based on the two other ratios (e.g., a weighted average of the counter ratio and current ratio). For instance, a weighted average with 50% weight in this example would result in a 3:1 ratio. The server may then determine the final weights based on the new ratio. For example, the server may assign the heaviest feature type a pre-defined maximum value and each other feature type a percentage of that maximum value according to the new ratio.

In 1240, the server resets the counters for all the media types and the selection counter. The method then begins again, as indicated by the feedback loop from 1240 to 1205. The server therefore proceeds to catalog the distribution of feature types associated with the next 100 selections, updates the weights based on those selections, and so forth.

Figure 13:
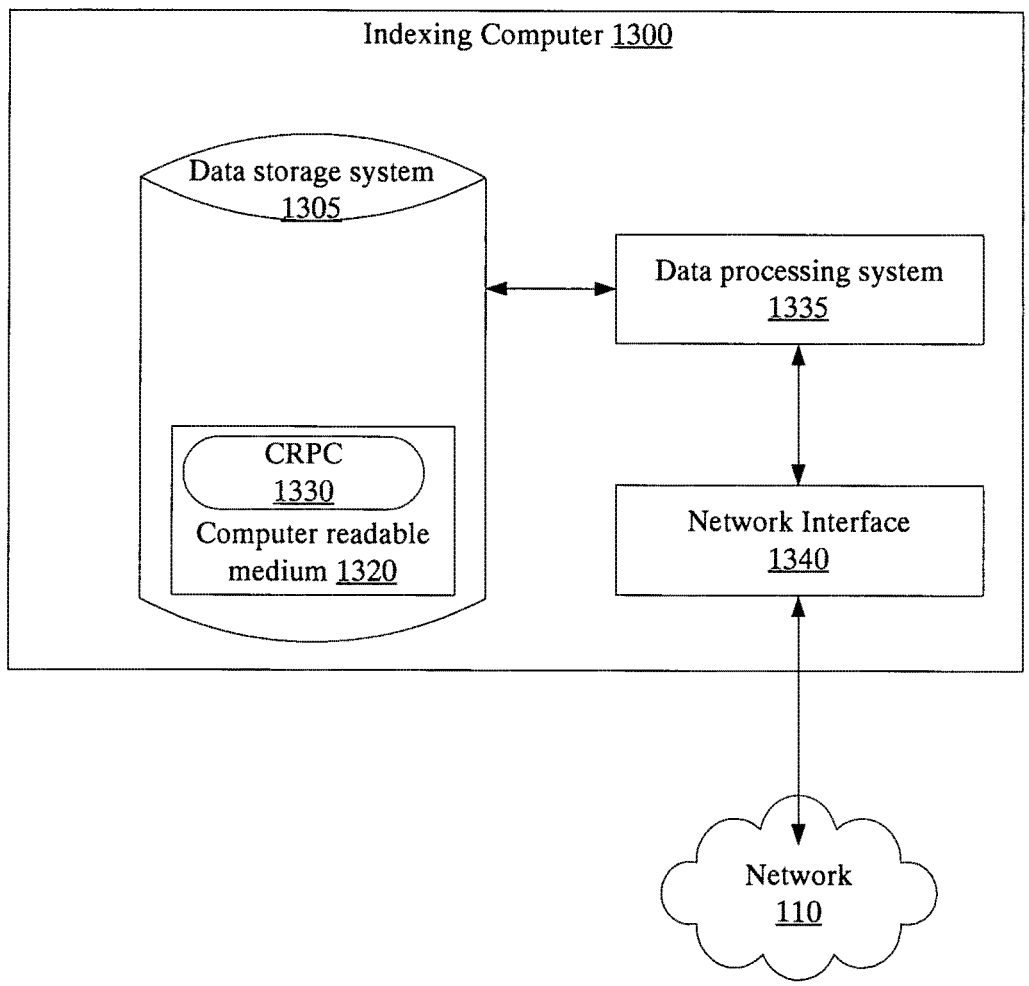
FIG. 13 illustrates a possible implementation for at least some components of a client device or indexing server, according to some embodiments.

FIG. 13 illustrates a possible implementation for at least some components of a client device or indexing server, according to some embodiments. As shown in FIG. 13, indexing computer 1300 may include: a data processing system 1335, which may include one or more data processing devices each having one or more microprocessors and/or one or more circuits, such as an application specific integrated circuit (ASIC), Field-programmable gate arrays (FPGAs), etc.; a network interface 1340 for receiving messages (e.g., messages transmitted from a client 105) and transmitting messages; a data storage system 1305, which may include one or more computer-readable mediums, such as non-volatile storage devices and/or volatile storage devices (e.g., random access memory (RAM)).

In embodiments where data processing system 1335 includes a microprocessor, a indexing computer program product is provided. Such a computer program product may include computer readable program code 1330, which implements a computer program, stored on a computer readable medium 1320. Computer readable medium 1320 may include magnetic media (e.g., a hard disk), optical media (e.g., a DVD), memory devices (e.g., random access memory), etc. In some embodiments, computer readable program code 1330 is configured such that, when executed by data processing system 1335, code 1330 causes the processing system to perform steps described above (e.g., steps described above with reference to the flow charts of FIGS. 2-8).

In other embodiments, indexing computer 1300 may be configured to perform steps described above without the need for code 1330. For example, data processing system 1335 may consist merely of specialized hardware, such as one or more application-specific integrated circuits (ASICs). Hence, the features of the present invention described above may be implemented in hardware and/or software. For example, in some embodiments, the functional components of collaboration server described above may be implemented by data processing system 1335 executing computer instructions 1330, by data processing system 1335 operating independent of any computer instructions 1330, or by any suitable combination of hardware and/or software.

Figure 14:
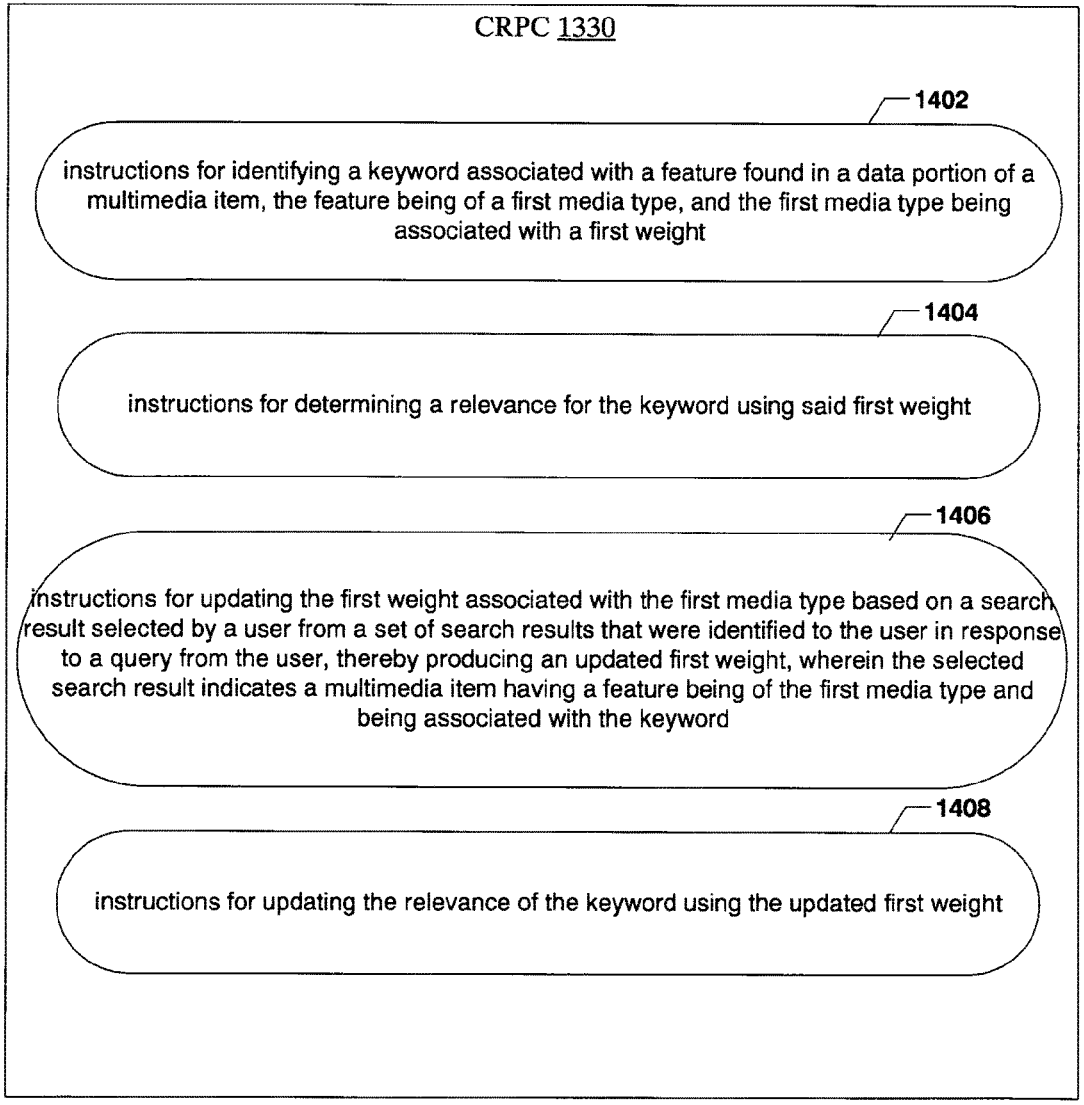
FIG. 14 illustrates an embodiment of a computer readable program code (CRPC) 1330, according to some embodiments.

FIG. 14 illustrates an embodiment of a computer readable program code (CRPC) 1330, according to some embodiments. In the embodiment shown, CRPC 1330 includes: (a) instructions (1402) for identifying a keyword associated with a first feature found in a data portion of a content item, the keyword being associated with a first media type, and the first media type being associated with a first weight; (b) instructions (1404) for determining a relevance for the keyword using the first weight associated with the first media type associated with the keyword; (c) instructions (1406) for updating the first weight associated with the first media type based on a particular set of content items, wherein each content item included in the particular set was added to the particular set of content items because the content item was selected by a user from a set of content items that were identified to the user in response to a query from the user, thereby producing an updated first weight; and (d) instructions (1408) for updating the relevance of the keyword using the updated first weight.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for adaptive indexing of multimedia content, the method comprising:

identifying a keyword associated with a first feature and a second feature found in a data portion of a multimedia item, the first feature being of a first media type and the second feature being of a second media type, and the first media type being associated with a first weight, and the second media type being associated with a second weight;

determining a relevance for the keyword by calculating a relevance value using said first weight and said second weight;

updating the first weight associated with the first media type based on a search result selected by a user from a set of search results that were identified to the user in response to a query from the user to produce an updated first weight, wherein the selected search result indicates a multimedia item having a feature being of the first media type and another feature being of the second media type, each of the features being associated with the keyword;

updating the second weight based on a particular set of content items being identified by the selected search result to produce an updated second weight; and updating the relevance of the keyword by calculating a relevance value using the updated first weight and the updated second weight.

2. The method of claim 1, wherein the first media type is one of image, sound, voice, and text.

3. The method of claim 1, wherein the first weight associated with the first media type is associated with a specific set of one or more users or devices and not with any other set of users or devices.

4. The method of claim 1, wherein the method further comprises prior to updating the first weight, determining a number of content items that have been selected by one or more users in response to one or more queries by the one or more users; and the step of updating the first weight occurs in response to a determination that the determined number meets or exceeds a predetermined threshold.

5. The method of claim 1, further comprising: transmitting, from a server to a client device in response to receiving from the client device a query comprising a query keyword, a search result identifying a set of content items that match the query; identifying a content item selected by a user of the client device from the set of items; determining whether data associated with the selected content item indicates that the content item contains a feature that is (i) mapped to the keyword and (ii) of the same media type as the least one first media type; in response to determining that the data associated with the selected content item indicates that the content item contains a feature that is (i) mapped to the keyword and (ii) of the same media type as the least one first media type, updating a counter, wherein the step of updating the first weight comprises updating the first weight using the counter.

6. The method of claim 1, wherein the step of updating the first weight comprises updating the first weight based on a distribution of determined feature types across N queries, where N>1.

7. The method of claim 6, wherein the updated weight is based on a ratio among current weights and a ratio among the distribution of determined feature types across the N queries.

8. The method of claim 6, wherein the updated weight is based on a weighted average of a ratio among current weights and a ratio among the distribution of determined feature types across the N queries.

9. The method of claim 1, wherein the multimedia item is a web page comprising a first file and a second file, wherein the first file is an HTML document and the second file is one of an image file and a video file, the first feature with which the keyword is associated was found in a data portion of the first file, and the second feature with which the keyword is associated was found in a data portion of the second file.

10. An apparatus for adaptive indexing of multimedia content, the comprising:

a data storage system; and a data processing system coupled to the data storage system, the data processing system being configured to:

identify a keyword associated with a first feature and a second feature found in a data portion of a multimedia item, the first feature being of a first media type and the second feature being of a second media type, and the first media type being associated with a first weight, and the second media type being associated with a second weight;

determine a relevance for the keyword by calculating a relevance value using the first weight and the second weight;

update the first weight associated with the first media type based on a search result selected by a user from a set of search results that were identified to the user in response to a query from the user to produce an updated first weight, wherein the selected search result indicates a multimedia item having a feature being of the first media type and another feature being of the second media type, each the features being associated with the keyword;

updating the second weight based on a particular set of content items being identified by the selected search result to produce an updated second weight; and update the relevance of the keyword by calculating a relevance value using the updated first weight and the updated second weight.

11. The apparatus of claim 10, wherein the first media type is one of image, sound, voice, and text.

12. The apparatus of claim 10, wherein the first weight associated with the first media type is associated with a specific set of one or more users or devices and not with any other set of users or devices.

13. The apparatus of claim 10, wherein the apparatus is further configured to determine a number of content items that have been selected by one or more users in response to one or more queries by the one or more users prior to updating the first weight, and the apparatus is configured such that the apparatus updates the first weight in response to a determination that the determined number meets or exceeds a predetermined threshold.

14. The apparatus of claim 10, wherein the apparatus is further configured to: transmit, in response to receiving from the client device a query comprising a query keyword, a search result identifying a set of content items that match the query; identify a content item selected by a user of the client device from the set of items; determine whether data associated with the selected content item indicates that the content item contains a feature that is (i) mapped to the keyword and (ii) of the same media type as the first media type; update a counter in response to determining that the data associated with the selected content item indicates that the content item contains a feature that is (i) mapped to the keyword and (ii) of the same media type as the first media type; and update the first weight using the counter.

15. The apparatus of claim 10, wherein the apparatus is configured to update the first weight based on a distribution of determined feature types across N queries, where N>1.

16. The apparatus of claim 15, wherein the updated weight is based on a ratio among current weights and a ratio among the distribution of determined feature types across the N queries.

17. The apparatus of claim 15, wherein the updated weight is based on a weighted average of a ratio among current weights and a ratio among the distribution of determined feature types across the N queries.

18. The apparatus of claim 10, wherein the multimedia item is a web page comprising a first file and a second file, wherein the first file is an HTML document and the second file is one of an image file and a video file, and said data portion of the multimedia item is a data portion of the second file.

19. A computer program product comprising a non-transitory computer readable medium storing computer instructions for adaptive indexing of multimedia content, the computer instructions comprising:

instructions for identifying a keyword associated with a first feature and a second feature found in a data portion of a multimedia item, the feature being of a first media type and the second feature being of a second media type, and the first media type being associated with a first weight and the second media type associated with a second weight;

instructions for determining a relevance for the keyword by calculating a relevance value using said first weight and said second weight;

instructions for updating the first weight associated with the first media type based on a search result selected by a user from a set of search results that were identified to the user in response to a query from the user to produce an updated first weight, wherein the selected search result indicates a multimedia item having a feature being of the first media type and another feature being of the second media type, each of the features being associated with the keyword;

instructions for updating the second weight based on a particular set of content items being identified by the selected search result to produce an updated second weight; and instructions for updating the relevance of the keyword using the updated first weight, and the updated second weight.

20. The computer program product claim 19, wherein the first media type is one of image, sound, voice, and text.

21. The computer program product claim 19, wherein the first weight associated with the first media type is associated with a specific set of one or more users or devices and not with any other set of users or devices.

22. The computer program product claim 19, wherein the computer instructions further comprise instructions for determining a number of content items that have been selected by one or more users in response to one or more queries by the one or more users prior to updating the first weight; and the instructions for updating the first weight are configured to be executed in response to a determination that the determined number meets or exceeds a predetermined threshold.

23. The computer program product claim 19, wherein the computer instructions further comprise: instructions for transmitting to a client device a search result identifying a set of content items that match a query; instructions for identifying a content item selected by a user of the client device from the set of items; instructions for determining whether data associated with the selected content item indicates that the content item contains a feature that is (i) mapped to the keyword and (ii) of the same media type as the least one first media type; instructions for updating a counter in response to a determination that the data associated with the selected content item indicates that the content item contains a feature that is (i) mapped to the keyword and (ii) of the same media type as the least one first media type, wherein the instructions for updating the first weight comprise instructions for updating the first weight using the counter.

24. The computer program product claim 19, wherein the instructions for updating the first weight comprise instructions for updating the first weight based on a distribution of determined feature types across N queries, where N>1.

25. The computer program product claim 24, wherein the updated weight is based on a ratio among current weights and a ratio among the distribution of determined feature types across the N queries.

26. The computer program product claim 24, wherein the updated first weight is based on a weighted average of a ratio among current weights and a ratio among the distribution of determined feature types across the N queries.

27. The computer program product claim 19, wherein the multimedia item is a web page comprising a first file and a second file, wherein the first file is an HTML document and the second file is one of an image file and a video file, the first feature with which the keyword is associated was found in a data portion of the first file, and the second feature with which the keyword is associated was found in a data portion of the second file.

* * * * *